UNITED STATES PATENT OFFICE.

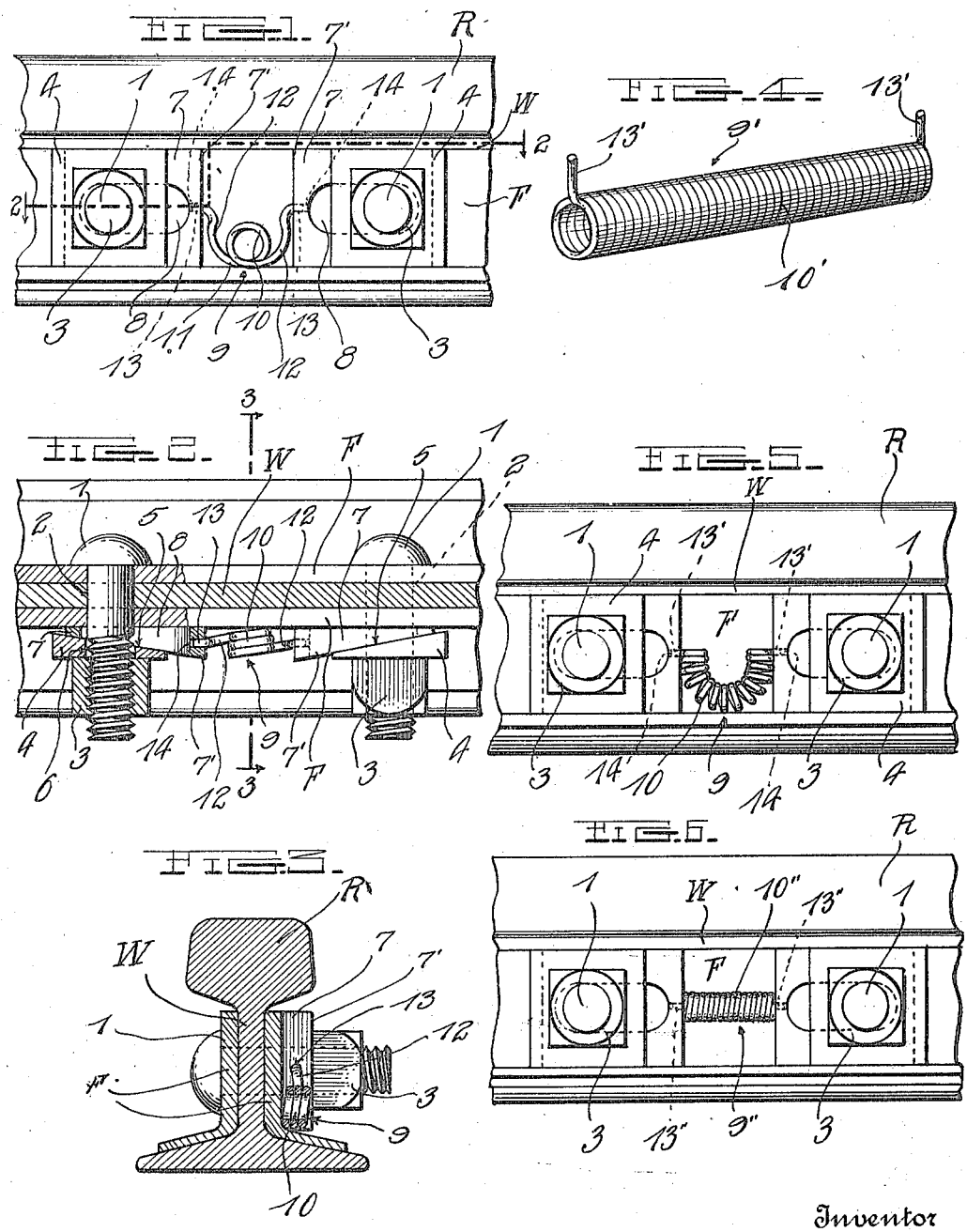

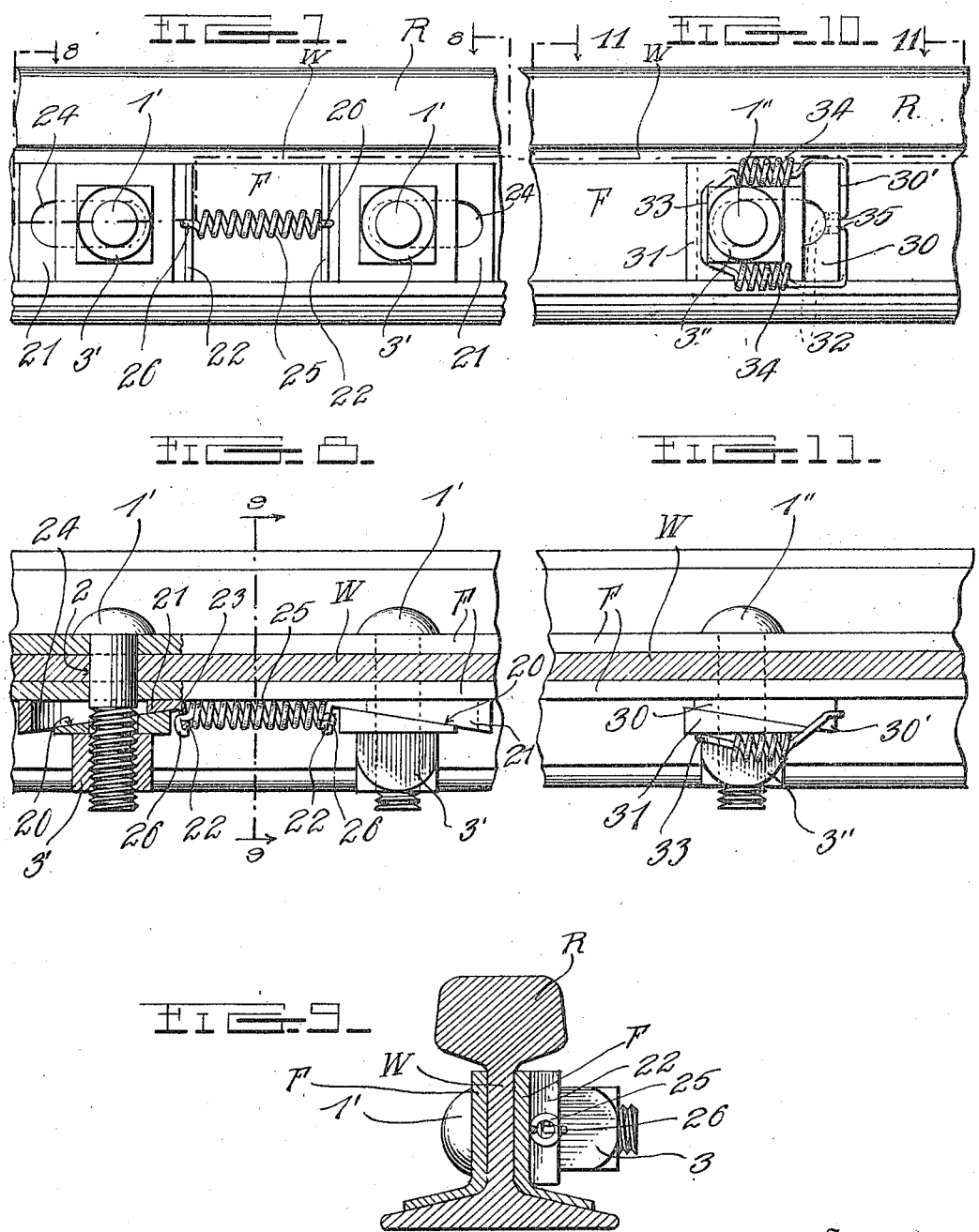

WILLIAM ISAAC HARP, OF GALAX, VIRGINIA, ASSIGNOR OF ONE-HALF TO CHARLES P. WAUGH, OF GALAX, VIRGINIA.

BOLT-TIGHTENER.

1,234,020.      Specification of Letters Patent.      Patented July 17, 1917.

Application filed November 9, 1916. Serial No. 130,405.

*To all whom it may concern:*

Be it known that I, WILLIAM ISAAC HARP, a citizen of the United States, residing at Galax, in the county of Grayson and State of Virginia, have invented certain new and useful Improvements in Bolt-Tighteners; and I do declare the following to be a full, clear, and exact description of the invention, such as will enable others skilled in the art to which it appertains to make and use the same.

This invention relates to new and useful improvements in railroad appliances, particularly devices used for retaining the bolts and fish plates of track rails in position.

The primary object of the invention is to provide means for automatically taking up slack between the bolts and fish plates which connect the meeting ends of the rails.

This object is carried out by means of a number of wedges disposed on the bolts which are to be operated upon and connecting therewith suitable resilient members for forcing the wedges in the proper directions.

With this general object as well as many other objects in view, the invention resides in the novel features of construction and combination and arrangement of parts which will be hereinafter more particularly described and claimed and shown in the drawings wherein:

Figure 1 is a side elevation of a portion of a rail showing my invention applied to the nuts and bolts therein;

Fig. 2 is a horizontal section taken substantially on the plane of the line 2—2 of Fig. 1;

Fig. 3 is a vertical transverse section on the line 3—3 of Fig. 2;

Fig. 4 is a detail perspective view of a modified form of spring member;

Fig. 5 is a side elevation of a rail showing the spring illustrated in Fig. 4 applied;

Fig. 6 is a similar view of still another modification of the invention;

Fig. 7 is a similar view of a third form of my invention;

Fig. 8 is a horizontal section taken on the line 8—8 of Fig. 7;

Fig. 9 is a vertical transverse section taken on the line 9—9 of Fig. 8;

Fig. 10 is a side elevation of a rail showing my invention applied to one of the bolts thereof;

Fig. 11 is a horizontal section on the line 11—11 of Fig. 10.

It will be noted from the accompanying drawings that several different forms of tighteners may be constructed in accordance with my invention, one form being illustrated in Figs. 1 to 3. In all of the forms the invention is shown applied to bolts 1 which extend through the usual openings 2 in the webs W of the rails R and also through openings in fish plates F, said bolts also being provided with nuts 3 of ordinary construction.

The device shown in the above mentioned figures consists of a number of washers 4 having their inner faces inclined as shown at 5, each being provided with an opening 6 to receive one of the bolts 1. One of these washers is disposed on each of the bolts with its inclined face disposed inwardly. Before, however, placing the washers on the bolts, wedge members 7 slotted as at 8 are placed thereon, one face of each of these members being inclined at substantially the same angle as the inclination of the faces 5 of the washers 4, said inclined faces being disposed in abutting relation.

After the wedges and washers have been placed in position as shown in Fig. 1 with the thick edges 7' of the wedge members disposed inwardly toward each other, the nuts 3 are screwed upon the threaded ends of the bolts. Before tightening the nuts to their greatest extent, the wedges 7 are moved inwardly toward each other, thus placing the outer ends of the slots 8 in engagement with the bolts 1. The resilient members are next ready to be placed in position, these members preferably consisting of coiled springs bent into proper shape. Each of the resilient members constructed in accordance with the first described form of my invention consists of a spring 9 formed from a single piece of heavy spring metal wire, the intermediate portion thereof being bent into several coils 10, the longitudinal axis of which is disposed transversely of the rail R when the member is in position. The ends of the coils 10 are extended outwardly at substantially right angles to the axis thereof as shown at 11 and then bent upwardly as at 12 to form a pair of arms which have a tendency to spring outwardly away from each other. The free ends of these arms are bent laterally outward to form fingers 13 which, when the device is in position between the wedge members 7 are disposed in seats 14 in the thick edges 7′ of said members. Before placing one of the members 9 between the wedge members 7, the arms 12 are forced inwardly toward each other so that as the bolts 3 gradually loosen due to the continuous vibration of passing trains, the wedge members 7 will be forced outwardly, thus taking up slack between said nuts and the adjacent fish plate. Each of the spring members 9 hangs downwardly as shown in Fig. 1, due to the disposition of the major portion of the weight of the device.

In Figs. 4 to 5 is shown an additional form of spring member for forcing the wedges 7 apart, the other parts of the invention being substantially similar to those heretofore described. In this instance the spring member 9′ is formed of a rather long helical contracting spring 10′ having its free ends extended laterally at right angles to the axis of the coil before being applied, thereby providing fingers 13′ for insertion into the seats 14 in the adjacent sides of the wedge members 7. Before the member 9′ is applied it appears as shown in Fig. 4, and when it is in position it is substantially U-shaped as shown in Fig. 5. This form will also very effectively force the wedges 7 apart as soon as the nuts become loosened to any extent.

A third form of spring member is shown in Fig. 6 and is used for the same purpose as members 9 and 9′. This member which is numbered 9″ is also in the form of a rather long helical spring 10″ but in this case it is so constructed that it will readily expand when contracted. The ends of the coil are bent outwardly into the plane occupied by the longitudinal axis thereof, thereby forming fingers 13″ for insertion in the seats in the adjacent thick edges of the wedge members 7. In this case the spring 10″ is contracted before it is placed between said wedge members so that its expansion will cause said members 7 to be forced apart should the nuts 3 become loosened.

In the forms heretofore described, the desired force is exerted on the thick edges of the wedge members to force the same in the proper directions. It is obvious that the same effect can be produced by causing the thin edges of said members to move toward each other. This idea is embodied in the structure shown in Figs. 7 to 9. In these figures the washers have inner inclined faces designated by the numeral 20 and the wedges which are disposed between the same and the fish plate F are designated by the numeral 21. In this instance, however, the thick edges of the washers are disposed toward each other and the thin edges of the wedge members positioned in the same manner, said thin edges being bent laterally outward to form flanges 22, in each of which an aperture 23 is formed. The wedge members 21 also have longitudinally extending slots 24 as in the other forms, these slots receiving the bolts 1′ which also extend through the webs of the rails, the fish plates F, and the washers 20. The threaded ends of the bolts 1′ receive nuts 3′.

After the wedge members 21 have been moved away from each other until the inner ends of the slots 24 engage the bolts 1′, the nuts 3′ are tightened as mentioned hereinbefore in describing the form shown in Figs. 1 to 3. The member used for taking up slack is then placed between said wedge members, the former consisting of a helical contracting spring 25 which has hooks 26 formed on its opposite ends for disposal within the openings 23. The action of this spring is the reverse of that exerted by the springs used for the same purpose in the other figures.

In case it is necessary to equip only one bolt with a member for taking up slack between its nut and the adjacent fish plate, the structure illustrated in Figs. 10 and 11 is provided. In these figures the bolt is designated by the numeral 1″ and the nut by 3″. The wedge member 30 and washer 31 are substantially the same in formation as those shown in Figs. 1 to 3, the former however, having a pair of vertically spaced seats 32 in its thick edge.

The spring member in this case is substantially U-shaped and formed of a single piece of spring metal wire, the base portion 33 of the U-shaped member resting against the nut 3″. The arms 34 are in the form of coils and extend above and below the wedge member and washer as clearly shown in Fig. 10. The free ends of the arms 34 are bent laterally inwardly parallel to the thick end 30′ of the wedge member, and then laterally to form fingers 35 which are disposed within the seats 32. Since the coils 34 are so constructed that they will contract after having once been expanded, the wedge member 30 will be forced in a direction to take up slack between the washer 31 and the fish plate.

While all of these devices are shown as used on railway rails and the bolts thereof and are primarily adapted for this purpose, they may also be very advantageously used wherever they are necessary to hold a bolt against movement. While this device is by no means a nut lock, it will tend to hold the nuts of the bolts against rotation, and will effectively tighten the engagement between said bolts and the article whenever the former becomes loosened.

I claim:

The combination with an article, a pair of bolts extending therethrough and a nut on the end of each bolt, of a washer disposed on each of said bolts, each having one inclined face, a slotted wedge on each of said bolts and in engagement with the article and the inclined faces of said washers, said wedges having their thick edges disposed inwardly toward each other, said edges also having seats therein, and a spring disposed between said wedges to force the same apart, said spring comprising a coil having its longitudinal axis disposed longitudinally of the bolts, the ends of said coil being extended outwardly in opposite directions and in planes at right angles to the axis thereof, said ends being extended upwardly to form spring arms to be disposed between said wedges, the free ends of said arms being bent laterally outwardly and disposed in said seats.

In testimony whereof I have hereunto set my hand in the presence of two subscribing witnesses.

WILLIAM ISAAC HARP.

Witnesses:
A. M. TODD,
R. B. COUCH.